FERROELECTRIC CONTROL CIRCUITS

Filed Nov. 5, 1964 4 Sheets-Sheet 1

INVENTOR.
BERNARD J. LECHNER
BY
Samuel Cohen
Attorney

INVENTOR.
BERNARD J. LECHNER
BY
Samuel Cohen
Attorney

FERROELECTRIC CONTROL CIRCUITS

Filed Nov. 5, 1964 4 Sheets-Sheet 3

INVENTOR.
BERNARD J. LECHNER
BY
Samuel Cohen
Attorney

INVENTOR.
BERNARD J. LECHNER
BY
Samuel Cohen
Attorney

United States Patent Office 3,478,224
Patented Nov. 11, 1969

3,478,224
FERROELECTRIC CONTROL CIRCUITS

Bernard J. Lechner, Princeton, N.J., assignor to RCA Corporation, a corporation of Delaware

Filed Nov. 5, 1964, Ser. No. 409,096
Int. Cl. H03k *17/02*
U.S. Cl. 307—88 9 Claims

ABSTRACT OF THE DISCLOSURE

Circuits in which the current passing through a load, such as an electroluminescent cell, depends upon the state, whether blocked or unblocked, of ferroelectric control elements. The ratio of maximum to minimum current is improved in the present circuits by continuously applying to the load a current which is of the same frequency as, is 180° out of phase with, and is close in amplitude to the current passing through the load in one of the states of the control elements.

The present invention relates to ferroelectric control circuits which are useful in ferroelectric electroluminescent panel-type displays, such as mural television displays, in ferroelectric memories, and in other ferroelectric storage and control circuits.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information, for the control and switching of electric signals, and for other purposes. Circuits employing such storage elements are discussed in Patents Nos. 2,695,397 and 2,695,398 to J. R. Anderson, and elsewhere in the literature.

A well known ferroelectric control circuit, termed a "transcharger," which is useful in panel-type displays and elsewhere, is described in detail in Rajchman et al., Patent No. 2,900,622, issued Aug. 18, 1959. One arrangement of a transcharger shown in the patent includes three ferroelectric elements, two of which are essentially in series with an alternating voltage source and a load, such as an electroluminescent element. The third ferroelectric element is coupled between the common connection of the first two ferroelectric elements and the setting and resetting pulse circuits. In one condition of the transcharger, the two series-connected ferroelectric elements are polarized in opposite directions and "block" the transcharger. In the other condition of the transcharger, the two series-connected ferroelectric elements are polarized in the same direction and "unblock" the transcharger.

In the operation of a circuit such as discussed above, in one condition of the series-connected ferroelectric elements, the alternating voltage which develops across the load should be relatively high and, in the other condition of these elements, this voltage should be reduced to an insignificant value. But, in practical circuits, it is found difficult to reduce the minimum voltage which develops across the load to as low a value as desired. In the case of an electroluminescent load element, for example, the minimum voltage is still sufficient to produce light output of low intensity. This reduces the contrast ratio defined as the maximum light intensity divided by the minimum light intensity, which it is possible to obtain from the electroluminescent element.

In the circuit of the present invention, the minimum voltage across the load is reduced by applying to the load, in the unblocked condition of the ferroelectric elements, an alternating voltage which is of the same amplitude as and 180° out of phase with the spurious voltage applied to the load by the voltage source. The circuit may include a pair of ferroelectric elements in series with one or two other ferroelectric elements, and an alternating voltage source connected across all ferroelectric elements. These circuit components make up a bridge and the load is connected between the connection of the pair of ferroelectric elements to the other such element(s) on the one hand, and to a terminal of the voltage source such that no voltage develops across the load when the ferroelectric elements are all polarized in the same direction.

The invention is discussed in greater detail below and is shown in the accompanying drawings, of which:

FIGURE 1 is a block circuit diagram of a prior art transcharger circuit;

FIGURES 2*a* and 2*b* are somewhat idealized hysteresis loops of the series-connected ferroelectric elements FE–1 and FE–2 of FIGURE 1;

Throughout the figures, similar reference numerals and characters are applied to similar parts.

Figure 1:
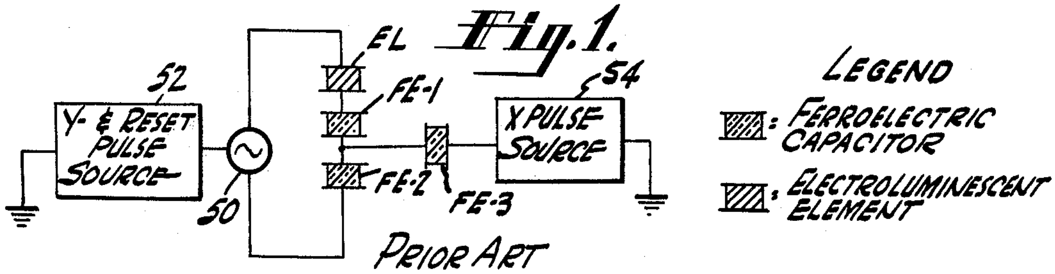

The circuit of FIGURE 1 is an improved form of transcharger which is described in detail in copending application Ser. No. 328,090, now Patent No. 3,197,744, filed Dec. 4, 1963, by Bernard J. Lechner and assigned to the same assignee as the present application. The circuit includes an alternating voltage source 50 connected across the essentially series-connected electroluminescent element EL and the ferroelectric elements FE–1 and FE–2. An X pulse source 54 is connected at one terminal to a point of reference voltage such as ground, and at its other terminal through a third ferroelectric element FE–3 to the common junction C between the ferroelectric elements FE–1 and FE–2. The three ferroelectric elements may be of the same capacitance. A Y and reset pulse source 52 is connected between ground and the alternating voltage source 50.

A detailed discussion of the operation of the circuit of FIGURE 1 appears in the copending application above. In brief, when the reset pulse source 52 applies a relatively large amplitude pulse to the circuit, the ferroelectric elements FE–1 and FE–2 become oppositely polarized and block the circuit. In this condition of the circuit, the elements FE–1, FE–2 present a high impedance to source 50 and very little of the source voltage develops across the electroluminescent element E. When the X pulse source 54 and Y pulse source 52 apply coincident pulses of opposite polarity to the circuit, the ferroelectric elements FE–1 and FE–2 become polarized in the same direction, thereby placing the circuit in the unblocked condition. In this condition, the two ferroelectric elements FE–1 and FE–2 present a low impedance to the source 50 and a substantial voltage develops across the electroluminescent element EL.

In the circuit of FIGURE 1, the X pulse source is of low internal impedance and the source 50 is connected to ground at an appropriate point in its circuit so that the "bridge" 50, EL, FE–1, FE–2 is balanced. The point C therefore remains essentially at ground, both during the blocked and unblocked condition of the circuit. It is because of this that there is little tendency for the alternating source 50 spuriously to block or unblock the transcharger circuit.

Figure 6:
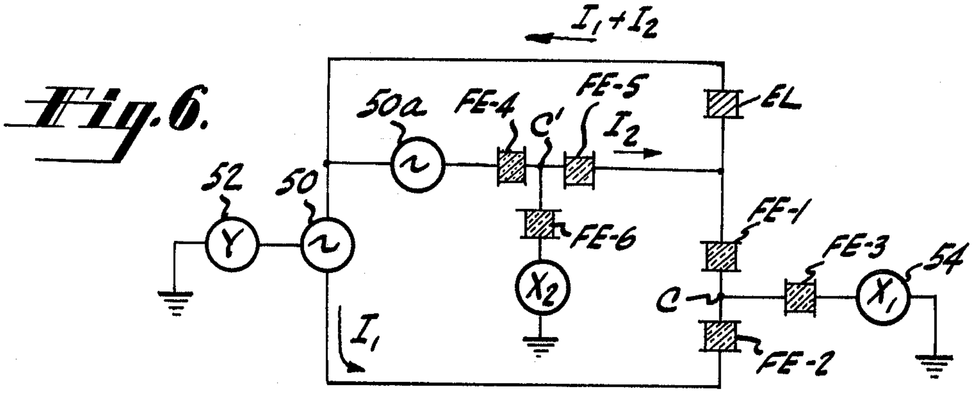
FIGURE 6 is a schematic circuit diagram of a second embodiment of an improved transcharger circuit.

As mentioned above, FIGURE 1 is a simplified showing. If desired, a second load element, such as a second electroluminescent element, may be employed in series with the second ferroelectric element FE–2, as shown in FIGURE 1 of the copending application. In a circuit of this type, the source 52 may be connected to the center tap of the source 50, as discussed in the application, to maintain the bridge in perfect balance. Or a circuit may be employed such as shown in FIGURE 6 of the application. Here, it is desirable to connect source 52 to a terminal of source 50 which is somewhat displaced from the center tap to maintain the bridge in balance, as discussed in detail in the application.

Figure 2A:
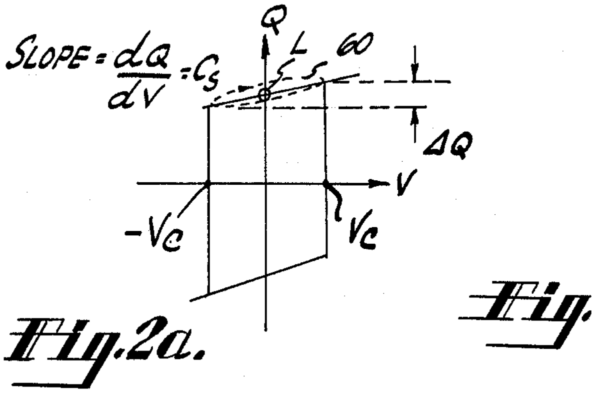
Figure 2B:
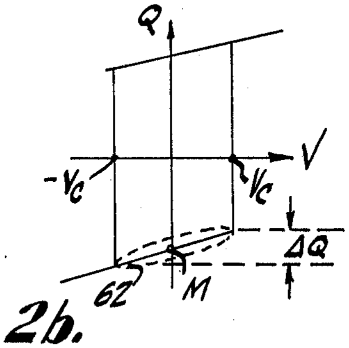

Somewhat idealized hysteresis loops for ferroelectric elements FE–1 and FE–2 appear in FIGURES 2*a* and 2*b*, respectively. Operating points L and M for the two ferroelectric elements, respectively, represent these elements polarized in opposite states and the transcharger therefore in a blocked condition. In this condition, the alternating voltage source drives the ferroelectric element FE–1 back and forth along the saturation region of its hysteresis loop, as indicated by dotted line 60 in FIGURE 2*a*. In a similar manner, the source 50 drives the ferroelectric element FE–2 along the lower saturation region of its hysteresis loop, as indicated by dotted line 62.

Since the hysteresis loops are not absolutely square, the saturation regions thereof just discussed are not absolutely parallel to the voltage axis. The slope of these regions is shown in the figures as $dQ/dV=C_S$, and the change in charge due to the alternating voltage is shown as $\Delta Q$. This charge $\Delta Q$ flows through the electroluminescent cell EL, and the voltage across the electroluminescent cell which results causes the cell to produce a light output of relatively low intensity.

Figure 3:
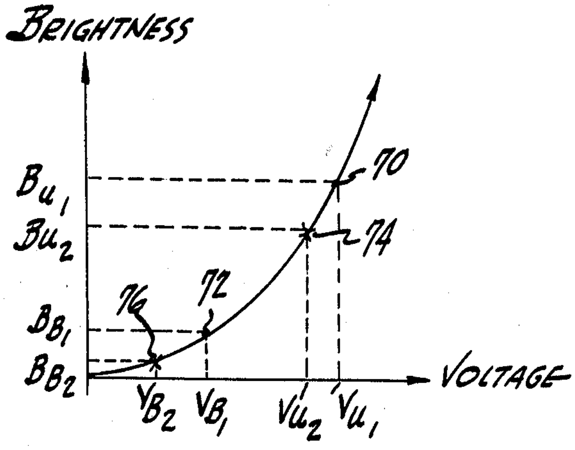
FIGURE 3 is a graph of voltage versus brightness for an electroluminescent element.

The brightness B versus voltage V characteristic of a typical electroluminescent element appears in FIGURE 3. In the unblocked condition of the transcharger of FIGURE 1, a voltage $V_{U_1}$ develops across the electroluminescent element, and this result in a light output $B_{U_1}$. In the blocked condition of the transcharger, the charge $\Delta Q$ of FIGURE 2 causes a voltage $V_{B_1}$ to develop across the electroluminescent element, and this results in a light output $B_{B1}$. The resulting contrast ratio is $B_{U1}/B_{B1}$, and, in a practical circuit which was operated, was found to be approximately 3 to 1. The respective brightnesses were 6 and 2 foot Lamberts.

Figure 4:
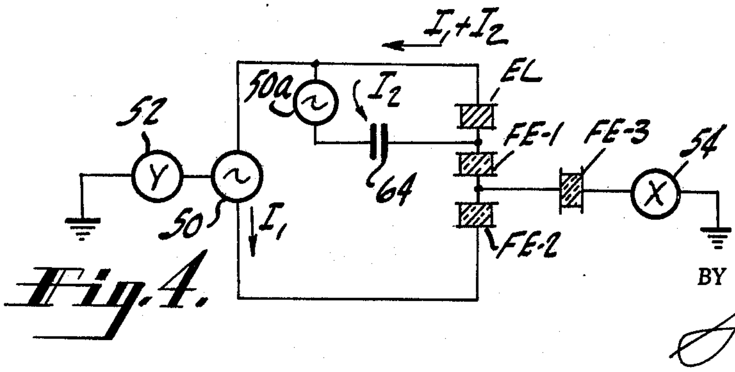
FIGURE 4 is a schematic circuit diagram of a new and improved transcharger circuit.

The contrast ratio above is substantially improved with the circuit of FIGURE 4. The transcharger circuit itself, as can be seen, is substantially identical with the one of FIGURE 1. However, a compensation circuit is added which consists of a second alternating voltage source **50*a* and capacitor 64, these two elements being connected across the electroluminescent element EL. The source 50*a* produces an output voltage which causes current flow $I_2$ through the electroluminescent element EL–1 which is 180° out of phase with and equal in amplitude to the current $I_1$ caused by the voltage of source 50**. The voltage thus developed across the electroluminescent element EL during the blocked condition of the transcharger will be substantially zero.

While shown as separate sources 50 and **50*a*, it is to be understood that there is synchronization between these two sources. In practice, the source 50 may include a primary winding and a secondary winding, and the source 50*a* may include a second secondary winding coupled to the same primary winding as the secondary winding in source 50**. By appropriately connecting the leads for this second secondary winding and employing the proper number of turns, a voltage of correct phase and appropriate amplitude is obtainable.

Figure 5:
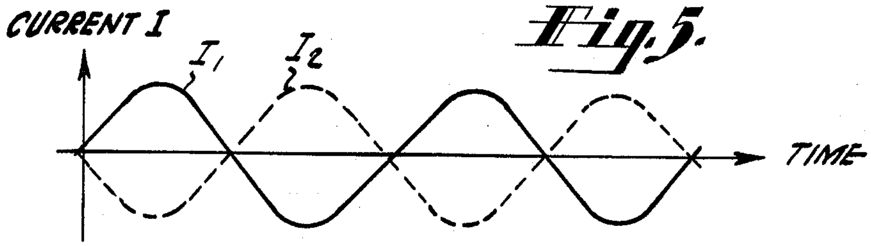
FIGURE 5 is a drawing of waveforms to help explain the operation of the circuit of FIGURE 4.

FIGURE 5 illustrates the effect of the compensating source **50*a*. The current $I_1$ is the current applied to the load EL during the blocked condition of the transcharger. The current $I_2$, shown by dashed lines, is the compensating current applied to the load by the source 50*a*. The sum of the two currents is a current of very low value. It is not exactly zero since the ferroelectric elements FE–1 and FE–2 are non-linear and the current passing through these elements therefore is not always exactly equal and opposite to the current passing through the linear element, capacitor 64**.

In a circuit built and operated employing the techniques of the circuit of FIGURE 4, the 3-to-1 contrast ratio discussed above was increased to a 10-to-1 contrast ratio. Without the circuit elements **50*a* and 64, the operating points of the electroluminescent element were at 70 and 72 in FIGURE 3, as discussed above. With the compensating circuit connected, the operating points were at 74 and 76. As may be observed from the graph, the contrast ratio at the latter two points is approximately 10-to-1, better than a 3-to-1 improvement. The brightnesses at points 74 and 76** were approximately 5 and 0.5 foot Lamberts respectively. This improvement in contrast ratio is obtained at the cost of a reduction of approximately 20% in peak brightness.

In the circuit above, source 50 produced 200 volts RMS at 400 cycles/sec. Source **50*a* produced 90 volts RMS at the same frequency and in phase synchronism with source 50. The electroluminescent cell employed was type NU 401**—a commercially available unit. The value of capacitance was 500 picofarads.

An improved circuit is shown in FIGURE 6. Here, rather than employing a capacitor as the coupling element for the source **50*a*, a second transcharger circuit including ferroelectric elements FE–4, FE–5 and FE–6 is used. The ferroelectric elements FE–5 and FE–4 are essentially in series with the source 50*a***. The ferroelectric element FE–6 connects a pulse source $X_2$ to the junction C′ between the first two ferroelectric elements. The source $X_2$ supplies pulses which maintain the ferroelectric elements FE–4 and FE–5 always polarized in opposite directions and therefore always in the blocked condition.

With the circuit of FIGURE 6, it is possible, in principle, completely to cancel the spurious alternating voltage developed across the electroluminescent element when the ferroelectric elements FE–1 and FE–2 are in the blocked condition. The ferroelectric elements FE–4 and FE–5 have substantially the same non-linear properties as the ferroelectric elements FE–1 and FE–2. Therefore, the compensating voltage developed across the electroluminescent element EL is always substantially 180° out of phase with and always substantially on the same amplitude as the spurious voltage.

Figure 7:
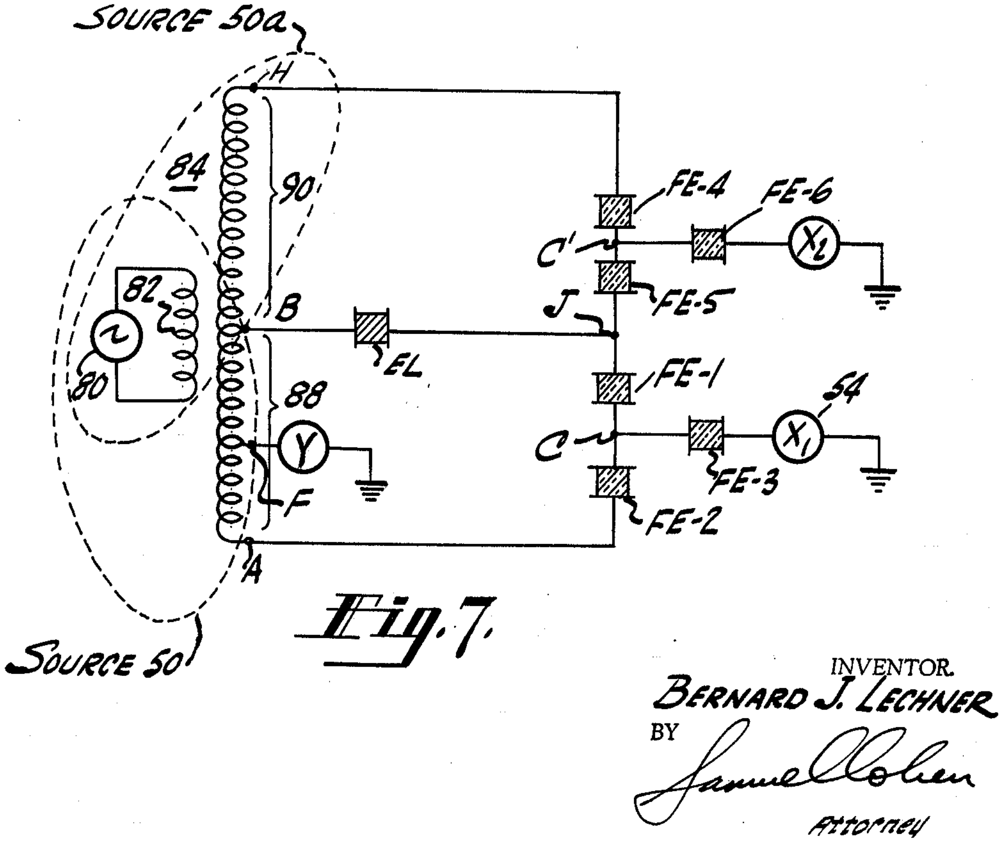
FIGURE 7 is another drawing of the circuit of FIGURE 6, showing additional details of the power supply.

FIGURE 7 is the circuit of FIGURE 6 showing the sources 50 and **50*a* in somewhat more detail and the elements of the circuit somewhat rearranged on the page. The source 50 comprises an alternating voltage source 80 supplying its output to the primary winding 82 of a transformer 84. A portion 88 of the secondary winding supplies its output to the circuit which includes the electroluminescent element EL and the ferroelectric elements FE–1 and FE–2. The portion 90** of the secondary winding supplies its output to the ferroelectric elements FE–4 and FE–5.

The source 50 may be thought of as including the alternating voltage source 80, the primary winding 82 and the secondary winding portion 88. The source 50*a* may be thought of as including the source 80, the primary winding 82 and the secondary winding 90. Both secondary windings are wound in the same direction. It is clear from the figure that the secondary winding 88 causes a voltage to develop across the electroluminescent element EL in one phase, whereas the winding 90 causes a voltage to develop across the same element in opposite phase. The number of turns in the secondary winding 90 is equal to the number of turns in the secondary winding 88, so that the two voltages developed across the electroluminescent element EL are of substantially the same amplitude when the ferroelectric elements FE–1 and FE–2 are oppositely polarized, that is, are in their blocked state.

In the circuit of FIGURE 7, it is desirable that the point C always remain at substantially ground potential. However, the bridge comprising secondary winding 88, the electroluminescent element EL, and ferroelectric elements FE–1 and FE–2 would be slightly unbalanced if the point F were the center tap of the transformer winding 88. This unbalance is caused by the loading effect of the electroluminescent element. It can be compensated for by placing a compensating load in series with the ferroelectric element FE–2 between this element and point A, as discussed in connection with FIGURE 7 of the copending Lechner application mentioned previously. Alternatively, the bridge may be balanced by connecting point F closer to point A than to point B. Compensation of this type is discussed in connection with FIGURE 6 of the copending application.

With the circuit of FIGURE 6 redrawn as shown in FIGURE 7, the operation of the circuit may be explained in another way. The complete circuit including two secondary windings 88, 90, and the four ferroelectric elements FE–1, FE–2, FE–4, FE–5 can be considered a bridge. The bridge is balanced when the two pairs of ferroelectric elements FE–4, FE–5 and FE–1, FE–2 are both blocked. In this condition of the circuit, point B is at essentially the same potential as point J and therefore no voltage develops across the electroluminescent element EL. On the other hand, when the pair of ferroelectric elements FE–1, FE–2 becomes unblocked, that is, both elements polarized in the same direction, and the ferroelectric elements FE–4, FE–5 remain blocked, the bridge becomes unbalanced. When this occurs, the voltage at point J differs substantially from the voltage at point B, and the electroluminescent element lights up.

Figure 8:
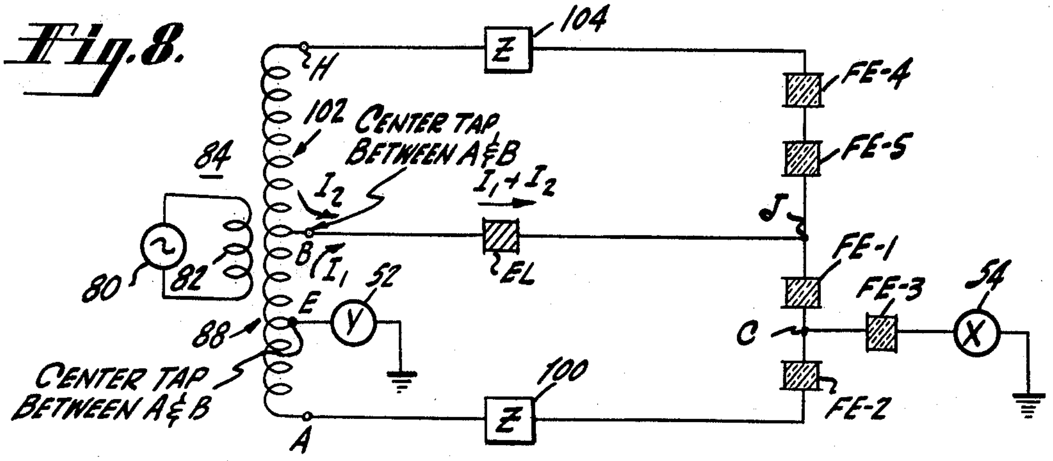
FIGURE 8 is a schematic diagram of a circuit according to the invention in which minimum voltage develops across the load during the unblocked condition of the ferroelectric elements.

In the circuits discussed so far, a compensating voltage is applied to the electroluminescent element load to compensate for the spurious voltage developed across the load due to leakage through the ferroelectric elements in their blocked condition. However, it is possible to operate the circuit in another way, as for example is illustrated in FIGURE 8. The arrangement of FIGURE 8 includes a first balanced bridge comprising secondary transformer winding 88, electroluminescent element EL, ferroelectric elements FE–1 and FE–2, and compensating impedance 100. The latter may be another electroluminescent element. The circuit also includes a second balanced bridge comprising transformer secondary windings 88, 102, compensating load impedance 104, ferroelectric elements FE–4, FE–5, FE–1 and FE–2, and compensating load impedance 100. The ferroelectric elements FE–1, FE–2, FE–3 and FE–4 may all be of the same thickness and area. An alternating voltage source 80 and the primary winding 82 of transformer 84 are employed to drive the circuit.

In the operation of the circuit of FIGURE 8, the alternating voltage source 80 produces a voltage across secondary winding output terminals A and H which, after a sufficient number of cycles, causes the pairs of ferroelectric elements FE–4, FE–5 and FE–1, FE–2 to become unblocked. In other words, these elements become polarized in the same direction. This occurs because of the imperfect storage characteristics of the elements.

When the elements FE–1, FE–2, FE–4 and FE–5 are all polarized in the same direction, they present a low impedance to the source voltage. However, since the bridge is balanced (impedance 100 is equal to impedance 104), the voltage at point J is equal to the voltage at point B. Looked at another way, the current $I_2$ produced by secondary winding 102 is equal in amplitude and opposite in phase to the current $I_1$ produced by secondary winding 88. Therefore, the sum of the currents $I_1$ plus $I_2$ is equal to zero, and no voltage develops across the electroluminescent element.

The ferroelectric elements FE–1, FE–2 may be placed in a blocked condition by applying thereto a voltage pulse of one polarity from the Y voltage source 52 and a voltage pulse of opposite polarity from the X voltage source 54. As in the previous circuits, these pulses polarize the ferroelectric elements FE–1 and FE–2 in opposite directions. Elements FE–4 and FE–5, however, remain polarized in the same direction, that is, they remain in an unblocked condition. Accordingly, the bridge which includes ferroelectric elements FE–4, FE–5, FE–1 and FE–2 becomes unbalanced and the voltage at point J thereupon becomes substantially different from that at point B. This difference in voltage across the electroluminescent element EL causes the latter to produce a light output.

In the circuit as shown in FIGURE 8, since the bridge which includes the electroluminescent cell EL, the ferroelectric elements FE–1, FE–2, and the impedance Z is perfectly balanced, the Y pulse source 52 is connected to the center tap E of the transformer secondary winding 88. This maintains the point C essentially at ground, as discussed previously.

In the circuit of FIGURE 8, it is preferred that the source Y include means for providing a reset pulse once each frame interval, just as in the circuit of FIGURE 7. However, under certain conditions, one could dispense with the reset pulse and depend upon the imperfections in the ferroelectric elements to permit the source itself to unlock the ferroelectric elements. In a circuit of this type, it may be desirable somewhat to unbalance the bridge 88, EL, FE–1, FE–2 and impedance 100 by, for example, connecting source Y to a point other than the center tap between A and B. When arranged in an array, the circuit parameters would then be so chosen that the unblocking interval would be not greater than one frame interval.

Figure 9:
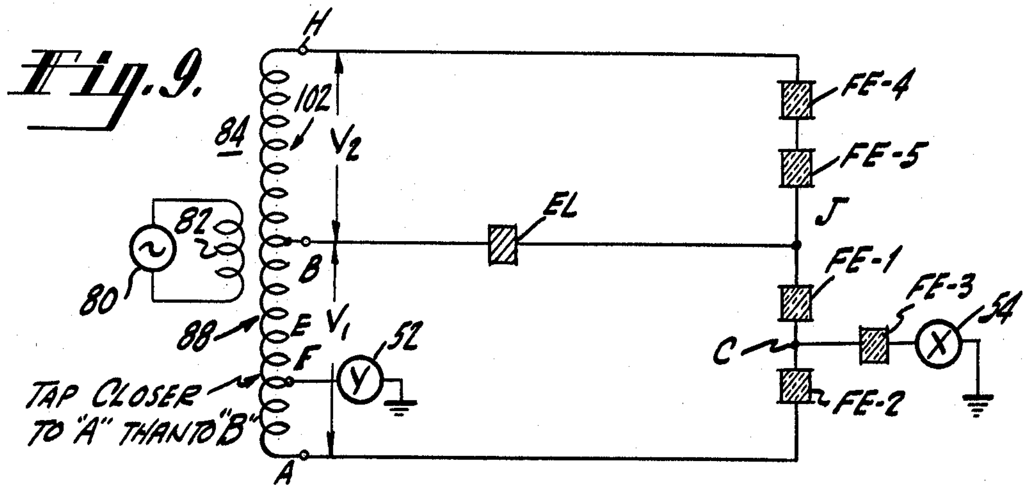
FIGURES 9 and 10 are schematic diagrams of modified forms of the circuit of FIGURE 8.

An alternative form of the circuit of FIGURE 8 appears in FIGURE 9. In this circuit, the compensating impedances 100 and 104 are omitted. This makes the lower bridge become unbalanced. However, the bridge 88, 102, FE–4, FE–5, FE–1, FE–2 remains balanced. The slight unbalance of the lower bridge is compensated for by connecting the Y pulse source 52 to a point F which is closer to point A than it is to point B.

In the circuits both of FIGURE 8 and FIGURE 9, two ferroelectric elements FE–4 and FE–5 are employed. It is to be understood that a single ferroelectric element of double the thickness of FE–4, for example, may be employed instead. As a more general proposition, the bridge will remain balanced so long as $V_2/d_{4,5}$ is equal to $V_1/d_{1,2}$, where $V_2$ is the voltage across secondary winding 102, $V_1$ is the voltage across secondary winding 88, $d_{4,5}$ is the total thickness of ferroelectric material employed in the branch FE–4, FE–5, and $d_{1,2}$ is the total thickness of ferroelectric material employed in the branch FE–1, FE–2.

Figure 10:
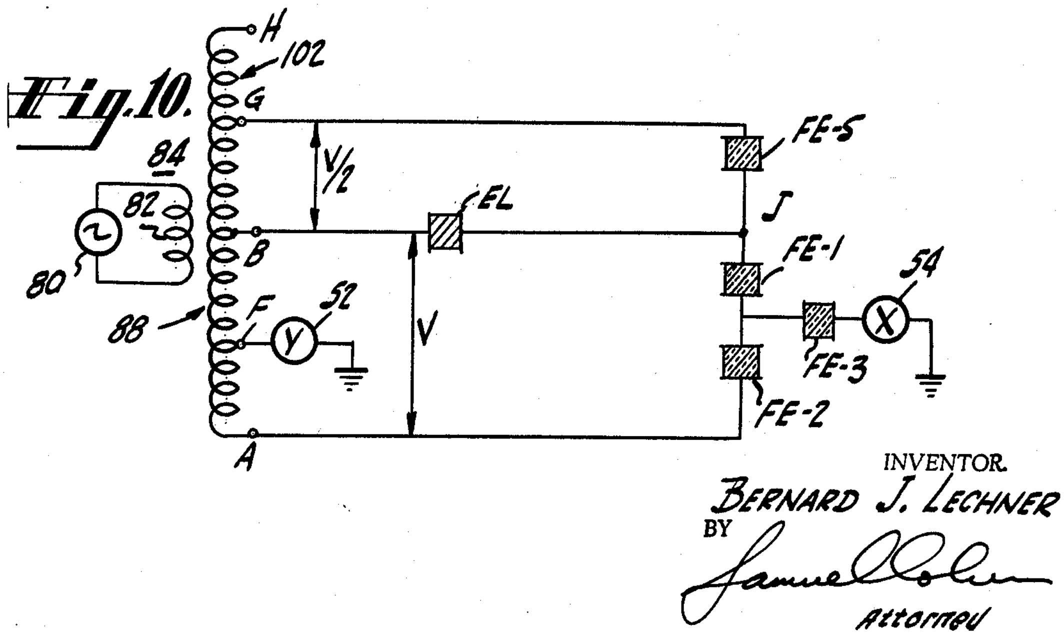

Using the relationship above, one may modify the circuits of FIGURES 8 and 9 as shown in FIGURE 10. Here, only a single ferroelectric element FE–5 is used, rather than the two ferroelectric elements FE–4, FE–5.

(All ferroelectric elements are of the same thickness.) It is now necessary to tap the secondary winding 102 at a point G such that the voltage across ferroelectric element FE–5 is one-half that across the two ferroelectric elements FE–4, FE–5.

Figure 11:
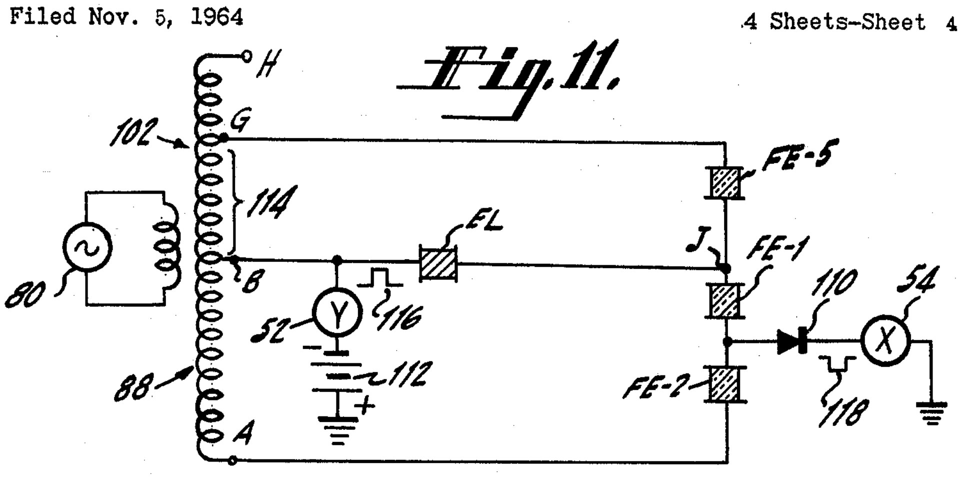
FIGURE 11 is a schematic diagram of another circuit according to the invention in which minimum voltage develops across the load during the unblocked condition of the ferroelectric elements.

Another form of the invention is shown in FIGURE 11. Here, the larger bridge is balanced in the manner discussed in connection with FIGURE 10. (Elements FE–5, FE–1 and FE–2 are of the same thickness and the voltage across FE–5 is one-half that across FE–1, FE–2 in the unblocked condition of the ferroelectric elements.) However, the smaller bridge need not be balanced. In addition, a diode 110 is substituted for the ferroelectric element FE–3, the Y pulse source 52 is connected directly to point B on the transformer, and a direct voltage bias source, shown as battery 112, is connected in series with the Y voltage source 52.

In the operation of the circuit of FIGURE 11, the direct voltage source 112 reverse-biases the diode 110. Therefore, even though there is some reverse leakage through the diode, as explained later, the path from C through the diode and the X voltage source 54 to ground is a relatively high impedance path. Accordingly, there is relatively little tendency for the source 80 to cause spurious blocking or unblocking by undesired current flow through the path, and there is no need to maintain the lower bridge 88, EL, FE–1, FE–2 balanced. Nevertheless, as a practical matter, if a transformer with a sufficient number of taps is available, one may connect the battery 112 and source 52 to a tap between A and B of winding 88 to balance the lower bridge. This has the advantage previously discussed and permits the battery 112 employed to be of relatively lower voltage output.

The three ferroelectric elements FE–5, FE–1 and FE–2 are initially polarized in the same direction. Therefore, they present a low impedance to the source. The bridge 88, 114, FE–5, FE–1, FE–2 is essentially balanced, as already discussed. Points J and B are therefore at substantially the same alternating voltage and the electroluminescent cell EL produces no light output.

The electroluminescent cell is energized by applying a positive voltage pulse 116 to the circuit from the Y voltage source 52, and a negative voltage pulse 118 from the X voltage source 54. These coincident pulses are of sufficient amplitude to overcome the reverse bias on the diode 110 and to oppositely polarize the ferroelectric elements FE–1 and FE–2. In other words, the coincident pulses block the ferroelectric elements FE–1 and FE–2. This causes the bridge which includes elements FE–5, FE–1 and FE–2 to become unbalanced and a substantial difference in alternating voltage develops at terminals B and J across the electroluminescent cell. The electroluminescent cell lights up under these conditions.

In the embodiment of FIGURE 11, no reset voltage source is necessary. Instead, the circuit parameters are so chosen that the alternating voltage source 80 switches the polarization of the three ferroelectric elements to the same direction within one frame interval. This switching of polarization is through the back leakage path of diode 110. If the diode 110 is a very good diode, that is, if it has substantially no leakage in the reverse direction, such leakage may be enhanced by placing a resistor of relatively large value across the diode.

A circuit such as shown in FIGURE 11 has been built and operated employing ceramic ferroelectric elements, a type 1N484 diode, and a 22-megohm resistor across the diode to achieve the desired reverse leakage. The maximum brightness of the electroluminescent element was about 10 foot Lamberts and the contrast ratio achieved was well in excess of 50 to 1.

Figure 12:
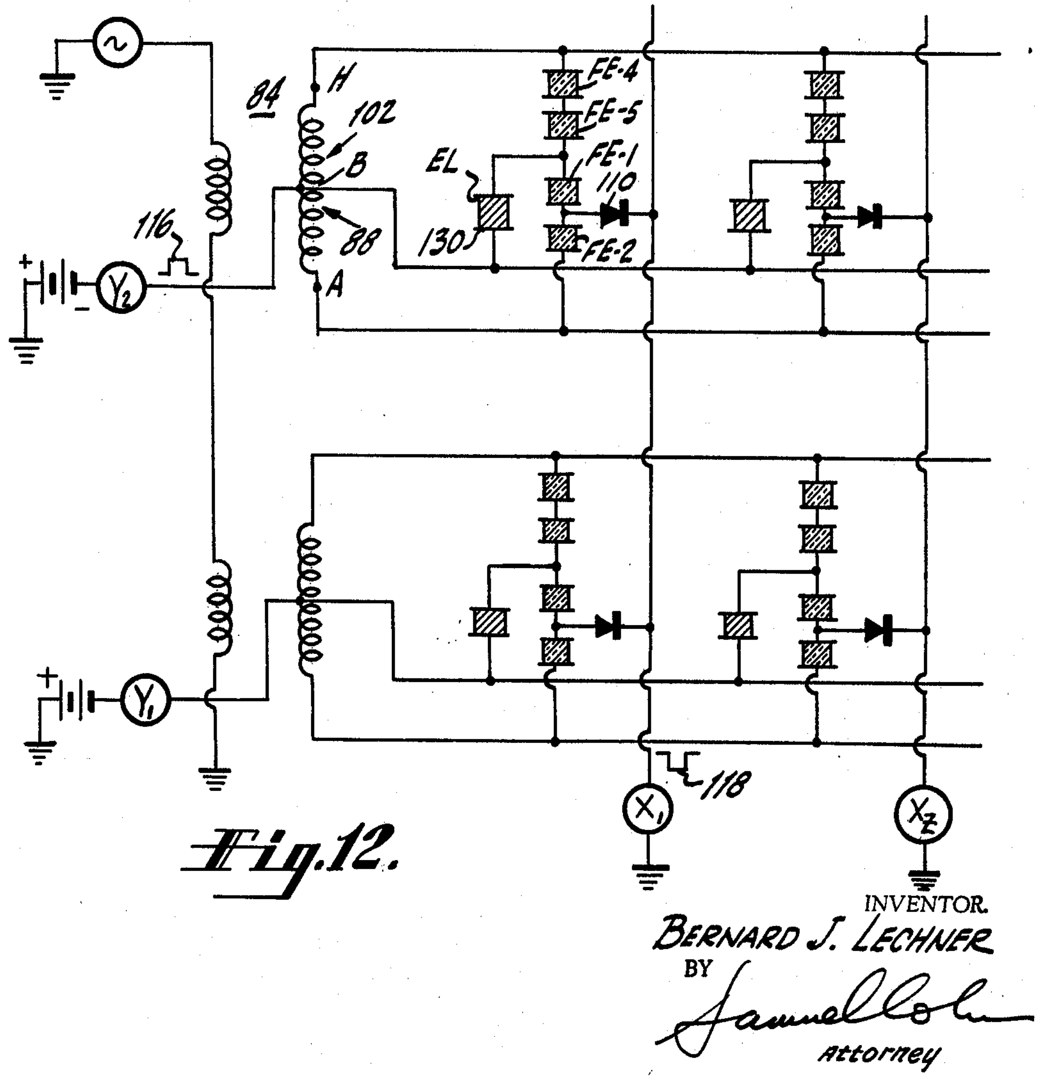
FIGURE 12 is a schematic diagram of a 2-by-2 array of circuits similar to the one of FIGURE 11.

A 2-by-2 array of a modified form of the circuit of FIGURE 11 appears in FIGURE 12. This circuit employs four ferroelectric elements corresponding to the like-legended elements of FIGURE 9. So arranged, B, the connection of the electroluminescent element to the transformer, is the center tap of the secondary winding 102, 88. The diode 110 is connected to the same place in the circuit as the like-numbered diode of FIGURE 11.

The operation of the circuit of FIGURE 12 is believed to be self-evident. An electroluminescent element EL in the array is energized by applying a coincident voltage from a selected X voltage source and a selected Y voltage source. For example, the cell 130 is energized by applying coincident voltage pulses 116 and 118 from sources $X_1$ and $Y_2$, respectively,

What is claimed is:

1. In combination, an alternating voltage source;

two ferroelectric elements connected essentially in series with said source which are polarized in the same direction to assume an unblocked condition and in opposite directions to assume a blocked condition;

a load in circuit with said two ferroelectric elements and voltage source which, in the blocked condition of said elements, receives a current of one value from said source and, in the unblocked condition of said elements, receives a current of a second value from said source; and means other than said two ferroelectric elements for applying to said load a current which is of the same frequency as, is substantially 180° out of phase with, and is close in amplitude to said second current.

2. In combination:

an alternating voltage source;

two ferroelectric elements connected essentially in series with said source which are polarized in the same direction to assume an unblocked condition and in opposite directions to assume a blocked condition;

a load in circuit with said two ferroelectric elements and voltage source which, in the blocked condition of said elements, receives a relatively small current from said source and, in the unblocked condition of said elements, receives a relatively large current from said source; and means including a third ferroelectric element for applying to said load a current which is of the same frequency as, is substantially 180° out of phase with, and is close in amplitude to said relatively large current.

3. In combination:

an alternating voltage source;

two ferroelectric elements connected essentially in series with said source which are polarized in the same direction to assume an unblocked condition and in opposite directions to assume a blocked condition;

a load in circuit with said two ferroelectric elements and voltage source which, in the blocked condition of said elements, receives a relatively small current from said source and, in the unblocked condition of said elements, receives a relatively large current from said source; and means including two ferroelectric elements always maintained in the unblocked condition for applying to said load a current which is of the same frequency as, is substantially 180° out of phase with, and is close in amplitude to said relatively large current.

4. In combination, a bridge network having four legs, the first leg including at least one ferroelectric element, the second leg including two additional ferroelectric elements, and the third and fourth legs comprising together an alternating voltage source, the respective voltages provided by the third and fourth legs being such that, in the unblocked condition of the two ferroelectric elements in the second leg, the connection between the first and second legs is at substantially the same alternating current potential as the connection between the third and fourth legs;

a load element connected between the connection of the first and second legs and the connection of the third and fourth legs; and means coupled to the second leg of said bridge network for placing the two ferroelectric elements therein in a blocked condition, whereby a substantial voltage develops across said load element.

5. In combination, a bridge network having four legs, the first leg including two ferroelectric elements which are always in the unblocked state, the second leg including a pair of additional ferroelectric elements, and the third and fourth legs comprising together an alternating voltage source, the respective voltage provided by the third and fourth legs being such that, in the unblocked condition of the two ferroelectric elements in the second leg, the connection between the first and second legs is at substantially the same alternating current potential as the connection between the third and fourth legs;

a load element connected between the connection of the first and second legs and the connection of the third and fourth legs; and means coupled to the second leg of said bridge network for placing the two ferroelectric elements therein in a blocked condition, whereby a substantial voltage develops across said load element.

6. In combination, a first bridge network having four legs, the first leg including at least one ferroelectric element, the second leg including second and third ferroelectric elements, and the third and fourth legs comprising together an alternating voltage source, the respective voltages provided by the third and fourth legs being such that, in the unblocked condition of the two ferroelectric elements in the second leg, the connection between the first and second legs is at substantially the same alternating potential as the connection between the third and fourth legs;

a load element connected between the connection of the first and second legs and the connection of the third and fourth legs;

a second bridge network having four legs formed in part by the first bridge network, the first leg of said second bridge network comprising said second ferroelectric element and load, its second leg comprising said third ferroelectric element, and the third and fourth legs comprising together a portion of said alternating voltage source; and means coupled between the connection of the first and second legs of the second bridge on the one hand and another portion of the second bridge on the other hand for placing said second and third ferroelectric elements in a blocked condition, whereby a substantial voltage develops across said load element.

7. In combination, a first bridge network having four legs, the first leg including first and second ferroelectric elements which are always in an unblocked state, the second leg including third and fourth ferroelectric elements, and the third and fourth legs comprising together an alternating voltage source, the respective voltages provided by the third and fourth legs being such that, in the unblocked condition of the two ferroelectric elements in the second leg, the connection between the first and second legs is at substantially the same alternating potential as the connection between the third and fourth legs;

a load element connected between the connection of the first and second legs and the connection of the third and fourth legs;

a second bridge network having four legs formed in part by the first bridge network, the first leg of said second bridge network comprising said third ferroelectric element and load, its second legs comprising said fourth ferroelectric element, and the third and fourth legs comprising together a portion of said alternating voltage source; and means coupled between the connection of the first and second legs of the second bridge on the one hand and another portion of the second bridge on the other hand for placing said third and fourth ferroelectric elements in a blocked condition, whereby a substantial voltage develops across said load element.

8. In combination, a first bridge network having four legs, the first leg including at least one ferroelectric element, the second leg including second and third ferroelectric elements, and the third and fourth legs comprising together an alternating voltage source, the respective voltages provided by the third and fourth legs being such that, in the unblocked condition of the two ferroelectric elements in the second leg, the connection between the first and second legs is at substantially the same alternating potential as the connection between the third and fourth legs;

a load element connected between the connection of the first and second legs and the connection of the third and fourth legs;

a second bridge network having four legs formed in part by the first bridge network, the first leg of said second bridge network comprising said second ferroelectric element and load, its second leg comprising said third ferroelectric element, and the third and fourth legs comprising together a portion of said alternating voltage source;

a path which exhibits a high impedance by virture of a diode normally biased to cut-off, connected between the connection of said second and third ferroelectric elements and ground; and means in said path coupled through said diode to the connection between said second and third ferroelectric elements for placing said second and third ferroelectric elements in a blocked condition, whereby a substantial voltage develops across said load element.

9. In combination, a bridge network having four legs, the first leg including at least one ferroelectric element, the second leg including a pair of additional ferroelectric elements, and the third and fourth legs comprising together an alternating voltage source, the respective voltages provided by the third and fourth legs being such that, in the unblocked condition of the two ferroelectric elements in the second legs, the connection between the first and second legs is at substantially the same alternating potential as the connection between the third and fourth legs;

a load element connected between the connection of the first and second legs and the connection of the third and fourth legs;

a path including, in series, a diode, coupled between the connection between said pair of ferroelectric elements and a point of reference potential;

biasing means coupled to said diode for normally maintaining the same cut-off, whereby said path exhibits a relatively high impedance; and means coupled through said diode to the second leg of said bridge network for applying pulses of sufficient amplitude to render the diode conductive and to place the two ferroelectric elements in said second leg in a blocked condition, whereby a substantial voltage develops across said load element.

References Cited

UNITED STATES PATENTS 2,905,830 9/1959 Kazan ---------- 340—173.2

(Other references on following page)

UNITED STATES PATENTS

| | | | |
|---|---|---|---|
| 3,247,390 | 4/1966 | Kazan | 315—151 |
| 2,884,618 | 4/1959 | Epstein | 340—173.2 |
| 2,900,622 | 8/1959 | Rajchman et al. | 340—173.2 |
| 3,197,744 | 7/1965 | Lechner | 340—173.2 |
| 3,215,990 | 11/1965 | Gnuse | 340—173.2 |
| 3,274,567 | 9/1966 | Fatuzzo | 340—173.2 |
| 3,280,332 | 10/1966 | Yando | 340—173.2 |

STANLEY M. URYNOWICZ, Jr., Primary Examiner

B. L. HALEY, Assistant Examiner

U.S. Cl. X.R.

315—166; 340—173.2